United States Patent [19]

Gota et al.

[11] 3,839,862
[45] Oct. 8, 1974

[54] EXHAUST EMISSION CONTROL DEVICE FOR AN INTERNAL COMBUSTION ENGINE

[75] Inventors: Kenji Gota; Norikatsu Ishikawa, both of Susono, Japan

[73] Assignee: Toyota Jidosha kogyo Kabushiki Kaisha, Aichi-ken, Japan

[22] Filed: Oct. 2, 1972

[21] Appl. No.: 293,938

[30] Foreign Application Priority Data
Oct. 1, 1971  Japan.............................. 46-76932

[52] U.S. Cl..................... 60/282, 23/277 C, 60/323
[51] Int. Cl............................................... F01n 3/10
[58] Field of Search............ 60/282, 302, 303, 323, 60/311; 23/277 C; 181/40

[56] References Cited
UNITED STATES PATENTS

| | | | |
|---|---|---|---|
| 3,210,161 | 10/1965 | Soltau | 60/303 |
| 3,302,394 | 2/1967 | Pahnke | 60/282 |
| 3,413,803 | 12/1968 | Rosenlund | 60/282 |
| 3,441,381 | 4/1969 | Keith | 60/302 |
| 3,488,723 | 1/1970 | Veazie | 60/282 |
| 3,633,368 | 1/1972 | Rosenlund | 60/282 |

FOREIGN PATENTS OR APPLICATIONS
859,428  1/1961  Great Britain........................ 60/311

*Primary Examiner*—Douglas Hart
*Attorney, Agent, or Firm*—Stevens, Davis, Miller & Mosher

[57] ABSTRACT

This invention relates to an exhause emission control device for an internal combustion engine.

Said device comprises a primary reaction chamber comprising two chambers directly connected to inlet ports for introducing exhausts from the internal combustion engine into the primary reaction chamber and having exhaust outlet openings juxtaposed to each other, a secondary reaction chamber formed in the downstream zone of an exhaust passage including a space between said chambers and connected to an exhaust outlet port, and a heat insulating cylindrical body enclosing said reaction chambers.

1 Claim, 5 Drawing Figures

EXHAUST EMISSION CONTROL DEVICE FOR AN INTERNAL COMBUSTION ENGINE

This invention relates to an exhaust emission control device referred to as a manifold reactor which is effective to cause unburned components in the exhausts of an internal combustion engine to undergo oxidation reaction by the thermal energy of the exhausts themselves to eliminate noxious elements in the exhausts.

Proposals have already been made to use exhaust emission control devices of the character described for the purpose of eliminating noxious elements in the exhausts emitted by internal combustion engines. Such devices generally comprise a reaction chamber or an inner core of the manifold chamber in which a wall surface made of metal is provided and the exhausts from the engines introduced into the reaction chamber are caused to impinge on the wall surface. The exhausts are mixed with secondary air, and kinetic energy of the exhausts is converted into thermal energy.

Some disadvantages are associated with the exhaust emission control devices of this type of the prior art. When exhausts impinge on the wall surface, part of their thermal energy tends to be dissipated through contact with the wall surface. There is the tendency of exhausts which are yet to undergo reaction to be mixed in the reaction chamber with exhausts which have already undergone reaction, thereby interfering with the achievement of high efficency in eliminating noxious elements in the exhausts by recombustion. Besides, the aforementioned mixture of exhausts and secondary air tends to be vented to atmosphere before it undergo reaction thoroughly.

The present invention obviates the aforementioned disadvantages of the prior art. Accordingly, the invention has as its object the provision of an exhaust emission control device for an internal combustion engine, having neither catalysts nor ignition means in the device and easy to fabricate, which permits elimination of noxious elements in the exhausts still containing unburned components to be effected by causing streams of the exhausts to impinge on one another and to diffuse and thorougly mixing the exhausts with secondary air while permitting the temperature of che exhausts to rise during theprocess.

Additional and other objects as well as features and advantages of the invention will become evident from the description set forth hereinafter when considered in conjunction with the accompanying drawings, in which.

Figure 1:
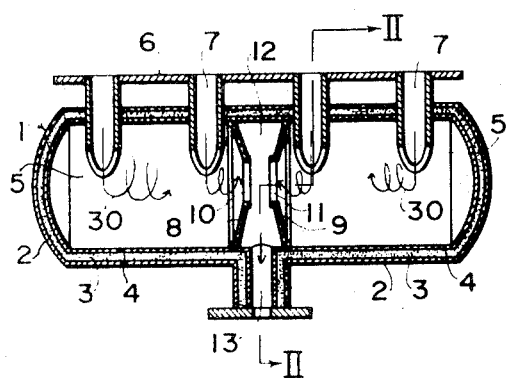
FIG. 1 is a vertical sectional view of the exhaust emission control device comprising one embodiment of the present invention.
Figure 2:
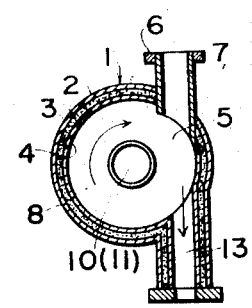
FIG. 2 is a sectional view taken along the line II—II of FIG. 1.

FIGS. 1 and 2 illustrate one embodiment of the invention. The exhaust emission control device or manifold reactor 1 comprises a primary reaction chamber 5 of a large volume formed in the reactor body comprising an outer plate 2, a heat insulating material layer 3 and an inner plate 4 made of a heat resisting material. The manifold reactor 1 is connected to an internal combustion engine (not shown) through a flange 6.

The primary reaction chamber 5 is connected to an exhaust port (not shown) on the internal combustion engine side through exhaust ports which are a plurality of exhaust inlet ports 7, 7 disposed tangentially of the outer periphery of the primary reaction chamber 5 to open therein as shown in FIG. 2. Shield plates 8 and 9 funnel-shaped in cross-section are secured to the wall of the primary reaction chamber 5 at its central portion to be disposed normal to the longitudinal axis of the chamber so as to divide the primary reaction chamber 5 into adjacent two chambers.

The shield plates 8 and 9 are formed with openings 10 and 11 respectively of a suitable diameter each disposed at the bottom portion of a minor diameter of the funnel-shaped shield plates, the openings 10 and 11 being juxtaposed to each other. The shield plates 8 and 9 define therebetween a secondary reaction chamber 12 of a small volume. A gas outlet port 13 opening in the secondary reaction chamber 12 is disposed tangentially of the outer periphery of the secondary reaction chamber 12 as the inlet ports 7, 7 disposed tangentially of the outer periphery of the primary reaction chamber 5.

Exhausts emitted from a combustion chamber of the internal combustion engine is mixed with secondary air supplied under pressure by an air pump or the like, and the mixture is introduced through the inlet ports 7 disposed tangentially of the outer periphery of the chamber 5 into the two chambers of the primary reaction chamber 5 while moving along the inner wall of the chamber. Streams of the mixture flow in vortical form along the inner wall of the chamber 5 and gradually move toward the central portion of the chamber 5 as indicated at 30.

While moving toward the central portion of the chamber 5, the exhausts receive a large amount of thermal energy from the exhausts which have already undergone oxidation reaction in the chamber 5. This thermal energy is combined with the thermal energy of the exhausts themselves and causes unburned components in the exhausts to undergo oxidation reaction in the chamber 5.

The streams of exhausts moving in vortical form toward the center of the chamber 5 move through the openings 10 and 11 in the shield plates 8 and 9 respectively into the secondary reaction chamber 12 where the vortical streams of exhausts moving into the chamber 12 from opposite sides impinge on each other. As a result, the exhausts are formed into a turbulent flow. The information of the turbulent flow expedites the mixing of the exhausts with the secondary air, and at the same time a large amount of thermal energy is produced as the result of collision between the streams of exhauts, causing a rise in temperature in the secondary chamber 12. Thus, those unburned components which have passed through the primary reaction chamber 5 without undergoing reaction undergo perfect oxidation reaction in the secondary reaction chamber 12, and the exhausts are discharged from the manifold reactor 1 through the outlet port 13 after noxious elements have been eliminated by perfect combustion.

Figure 3:
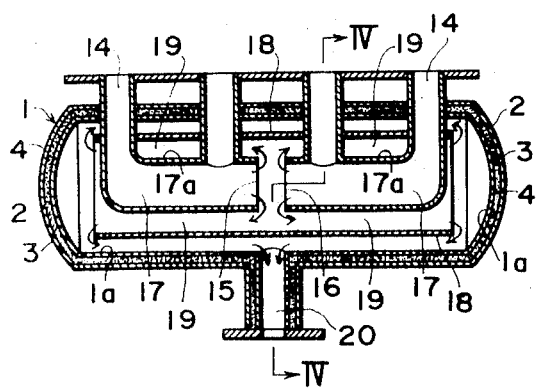
FIG. 3 is a vertical sectional view of the exhaust emission control device comprising another embodiment of the present invention.
Figure 4:
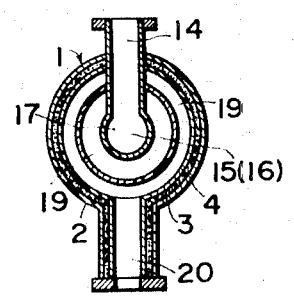
FIG. 4 is a sectional view taken along the line IV—IV of FIG. 3.

Another embodiment of the invention will now be described with reference to FIG. 3 and FIG. 4. Exhaust ports which serve as exhaust inlet ports 14, 14 are connected to exhaust manifolds $17_a$ and $17_a$ extending longitudinally of the manifold reactor 1 at its central portion to constitute primary reaction chambers 17, 17. The exhaust manifolds $17_a$ and $17_a$ have openings 15 and 16 respectively which are juxtaposed to and spaced apart a suitable distance from each other so that streams of the mixture of exhausts with secondary air can impinge on each other and form a turbulent flow between the two openings 15 and 16.

A radiation heat preventing cylindrical wall 18 of suitable diameter and length is interposed between the outer periphery of each of the primary reaction chambers 17 and 17 and the reactor body $1_a$ comprising the outer plate 2, heat insulating plate 3 and inner plate 4 made of a heat resisting material as is the case with the reactor body shown in FIG. 1 and FIG. 2. The outer periphery of each of the exhaust manifolds $17_a$ and $17_a$ and the inner wall surface of the radiation heat preventing cylindrical wall 18 define therebetween a secondary reaction chamber 19 which constitutes the downstream zone of an exhaust passage including the space between the openings 15 and 16.

An exhaust outlet port 20 which opens in the exhaust passage between the reactor body $1_a$ and the radiation heat preventing cylindrical wall 18 is connected at right angles to the reactor body $1_a$ in a position which is the center thereof.

A mixture of exhausts and secondary air is introduced into the primary reaction chambers 17 and 17 through the exhaust inlet ports 14, 14. The exhausts receive a large amount of thermal energy from the walls of the primary reaction chambers 17 and 17 of elevated temperature and the exhausts which have already undergone oxidation reaction in the chambers 17 and 17 as is the case with the mixture of exhausts introduced into the primary reaction chamber 5 of the embodiment shown in FIG. 1 and FIG. 2. Combined with the thermal energy of the exhausts themselves, this thermal energy causes unburned components in the exhausts to undergo oxidation reaction.

The stream of exhausts gradually move in the reaction chambers 17 and 17 toward the central portion of the reactor body $1_a$ while part of the exhausts burn. The streams moving from opposite directions impinge on each other at the openings 15 and 16 of the reaction chambers 17 and 17 respectively, with the result that a turbulent flow of exhausts is produced between the two openings 15 and 16. This expedites mixing of the exhausts and the secondary air while the temperature of the exhausts is increased. Thus, the exhausts is thoroughly mixed with secondary air elevated in temperature and introduced into the secondary reaction chamber 19.

While moving toward the downstream side of the secondary reaction chamber 19, unburned components in the exhausts undergo oxidation reaction and burn perfectly. As a result, the exhausts from which noxious elements have been eliminated are discharged from the manifold reactor 1 through the outlet port 20.

In the first embodiment of the invention, streams of exhausts move in vortical form from opposite sides of the reactor body toward its central portion and are caused to impinge on each other so that the exhausts may undergo secondary reaction in the secondary reaction chamber 12 of a small volume. In the second embodiment, the downstream zone of the exhaust passage including the space between the openings 15 and 16 serve as the secondary reaction chamber 19.

Figure 5:
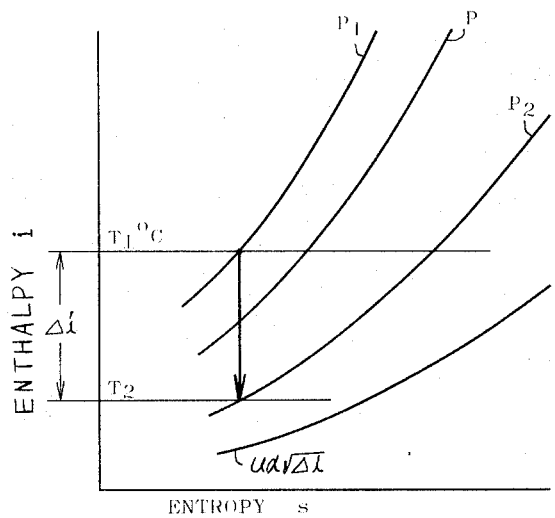
FIG. 5 is a graph showing the relation between changes in the rate of flow of gas and temperature.

FIG. 5 shows the relation between changes in the flow rate of exhausts and temperature. When stationary gas of the pressure $P_1$ and the temperature $T_1$ is introduced into a region where pressure is at a low level $P_1$, the temperature is reduced to a lower level $T_2$ while the rate of flow becomes $U\alpha \quad \Delta i$. If the rate of flow is reduced by some means, generally the original temperature is restored to the gas but not the original pressure. In the present invention, streams of the gas are caused to impinge on each other as means for reducing the rate of flow.

The present invention is constructed and operates as aforementioned. Since mixing of exhausts with secondary air takes place in a specific region of the reaction chamber by causing streams of the mixture to impinge on each other, the exhausts can be made positively to undergo oxidation reaction by a simple construction, thereby permitting noxious elements in thee exhausts to be eliminated at high efficiency.

Streams of the mixture of exhausts and secondary air impinge on each other and a turbulent flow of the mixture is produced. This expedites thorough mixing of the exhausts with the secondary air and generates heat. Exhausts are prevented from impinging on solids, so that little heat is dissipated through contact with the parts of the device and the device itself is not influenced greatly by the temperature. This enables the device to have high durability and to operate in a stable manner over a long period of time.

When the streams of the mixture of exhausts and secondary air impinge on each other, mixing of the exhausts and the secondary air is expedited and at the same time atemperature can be elevated at high efficiency, with the temperature being maintained at elevated levels over a long period of time. This permits those unburned components which have not hitherto burned in the primary reaction chamber can be ignited, thereby permitting oxidation reaction to take place at relatively high efficiency at a relatively low temperature level.

What is claimed is:

1. An exhaust emission control device for an internal combustion engine comprising a heat insulating body encompassing two primary reaction chambers, a shield plate of funnel shape in cross section at one end of each of said chambers and within said body, said shield plates having their smaller ends mutually facing one another and spaced apart to define therebetween a secondary reaction chamber, means to introduce exhaust gases into said primary reaction chambers and means to withdraw exhaust gases from said secondary reaction chamber.

* * * * *